United States Patent
Kapadia

(10) Patent No.: US 11,631,118 B2
(45) Date of Patent: Apr. 18, 2023

(54) DISTRIBUTED DEMAND GENERATION PLATFORM

(71) Applicant: SOHAM INC, Bellevue, WA (US)

(72) Inventor: Chaitanya Kapadia, Union City, CA (US)

(73) Assignee: SOHAM INC, Bellevue, WA (US)

( * ) Notice: Subject to any disclaimer, the term of this patent is extended or adjusted under 35 U.S.C. 154(b) by 0 days.

(21) Appl. No.: 16/377,939

(22) Filed: Apr. 8, 2019

(65) Prior Publication Data
US 2020/0202305 A1 Jun. 25, 2020

Related U.S. Application Data

(60) Provisional application No. 62/784,048, filed on Dec. 21, 2018.

(51) Int. Cl.
*G06Q 10/06* (2023.01)
*G06Q 10/10* (2023.01)
(Continued)

(52) U.S. Cl.
CPC ....... *G06Q 30/0613* (2013.01); *G01C 21/367* (2013.01); *G06F 1/08* (2013.01); *G06F 9/3877* (2013.01); *G06F 9/547* (2013.01); *G06Q 10/02* (2013.01); *G06Q 10/1095* (2013.01); *G06Q 50/01* (2013.01); *G10L 15/22* (2013.01); *H04L 51/02* (2013.01); *G10L 2015/223* (2013.01)

(58) Field of Classification Search
CPC ......... G06Q 30/0613; G06Q 10/1095; G06Q 50/01; G06Q 10/02; G06F 9/547; G06F 1/08; G06F 9/3877; G10L 15/22; G10L 2015/223; G01C 21/367; H04L 51/02; H04L 51/20
See application file for complete search history.

(56) References Cited

U.S. PATENT DOCUMENTS 7,693,735 B2 4/2010 Carmi et al.
8,244,566 B1 8/2012 Coley et al.
(Continued)

FOREIGN PATENT DOCUMENTS

AU 2016102125 A4 2/2017
CN 106096576 A * 11/2016 ............. G06F 21/32
(Continued)

OTHER PUBLICATIONS

Parlo, A Chatbot for Cutting Hair?, 2016, Medium.com; Retrieved from Internet: URL: https://medium.com/@Parlo/a-chatbot-for-cutting-hair-bcaaab8daad7; p. 1-6 (Year: 2016).*
(Continued)

*Primary Examiner* — Mehmet Yesildag
*Assistant Examiner* — Jeremy L Gunn
(74) *Attorney, Agent, or Firm* — BakerHostetler

(57) ABSTRACT

A demand generation platform includes a salon finding application associated with a social media, wherein an intent for finding a salon is expressed by a user on the social media. The architecture includes an intent analyzer deciphering the intent of the user, a salon service application program
(Continued)

interface (API) finding a salon based on the intent, and a database interface responding to a request for making an appointment with the salon.

17 Claims, 4 Drawing Sheets

(51) Int. Cl.

| | |
|---|---|
| *G06Q 50/00* | (2012.01) |
| *G06F 9/38* | (2018.01) |
| *G06F 1/00* | (2006.01) |
| *G06Q 30/0601* | (2023.01) |
| *H04L 51/02* | (2022.01) |
| *G06Q 10/02* | (2012.01) |
| *G01C 21/36* | (2006.01) |
| *G06F 1/08* | (2006.01) |
| *G06Q 10/1093* | (2023.01) |
| *G06F 9/54* | (2006.01) |
| *G10L 15/22* | (2006.01) |

(56) References Cited

U.S. PATENT DOCUMENTS

| | | | |
|---|---|---|---|
| 2002/0035493 A1 | 3/2002 | Mozayeny et al. | |
| 2002/0165926 A1 | 11/2002 | Rensin et al. | |
| 2003/0130882 A1* | 7/2003 | Shuttleworth | G06Q 10/109 709/204 |
| 2006/0265508 A1* | 11/2006 | Angel | H04L 29/12047 709/230 |
| 2009/0204753 A1* | 8/2009 | Bridge, Jr. | G06F 12/123 711/106 |
| 2011/0083138 A1* | 4/2011 | Sivasubramanian | G06F 16/217 719/328 |
| 2011/0153375 A1 | 6/2011 | Weinstock et al. | |
| 2011/0179114 A1* | 7/2011 | Dilip | G06F 16/9535 709/204 |
| 2012/0284100 A1 | 11/2012 | Goldberg | |
| 2014/0136262 A1* | 5/2014 | Uzzaman | G06Q 10/06311 705/7.19 |
| 2014/0337372 A1* | 11/2014 | Lee | G06F 8/30 707/767 |
| 2016/0092771 A1* | 3/2016 | Buckley | H04W 4/21 706/52 |
| 2016/0335686 A1 | 11/2016 | AthuluruTlrumala et al. | |
| 2017/0132255 A1 | 5/2017 | Gupta et al. | |
| 2017/0374198 A1 | 12/2017 | Silva et al. | |
| 2018/0129971 A1 | 5/2018 | Vlassis et al. | |
| 2019/0103111 A1* | 4/2019 | Tiwari | G06F 16/3329 |
| 2020/0202402 A1 | 6/2020 | Kapadia | |
| 2021/0248521 A1 | 8/2021 | Bright | |

FOREIGN PATENT DOCUMENTS

| | | |
|---|---|---|
| WO | 2015077653 A1 | 5/2015 |
| WO | WO 2018/170276 A2 | 9/2018 |

OTHER PUBLICATIONS

Amazon Web Services, Amazon API Gateway Developer Guide, copyrighted 2015 and available to the public Jul. 14, 2015 as captured by web.archive.org, p. 101-102 (Year: 2015).*
Meyer (May 17, 2018). Alexa—I need a haircut! (demo included), https://blog.presence.ai/alexa-i-need-a-haircut-demo-included-477c991646ed (Year: 2018).*
English translation of N 106096576 A (Year: 2016).*
"Chatbot—Wikipedia", Aug. 11, 2018, XP055638177, retrieved from the internet: URL:https://en.wikipedia.org/w/index.php?title=Chatbot@oldid=854440661 [retrieved on Oct. 31, 2019].
Anonymous: "Amazon Alexa—Wikipedia", Dec. 9, 2018, pp. 1-13, XP055673571, Retrieved from the Internet: URL:https://en.wikipedia.org/w/index.php?title=Amazon_Alexa&oldid=872757295 [retrieved on Mar. 4, 2020].
International Search Report and Written Opinion of the International Searching Authority, PCT/US2019/067982, dated Mar. 16, 2020, 11 pgs.
International Search Report and Written Opinion of the International Searching Authority, PCT/US2019/068003, dated Mar. 20, 2020, 11 pgs.
Michel Meyer: "Alexa—I need a haircut! (demo included)—PresenceAI", May 18, 2018, pp. 1-4, XP055673649, retrieved from the Internet: URL:https://blog.presence.ai/alexa-i-need-a-haircut-demo-included-477c991646ed [retrieved on Mar. 4, 2020].
Parlo: "A Chatbot for Cutting hair?—Parlo—Medium", Sep. 26, 2016, pp. 1-6, XP055673968, retrieved from the internet: URL:https://medium.com/@Parlo/a-chatbot-for-cutting-hair-bcaaab8daad7 [retrieved on Mar. 5, 2020].
Rajan Dr R Arokia Paul: "Serverless Architecture—A Revolution in Cloud Computing", 2018 Tenth International Conference on Advanced Computing (ICOAC), IEEE, Dec. 13, 2018, pp. 88-93, XP033677836, [retrieved on Dec. 20, 2019].
International Search Report and Written Opinion of the International Searching Authority, PCT/US2019/067934, dated Jun. 29, 2020, 11 pgs.
"Serverless computing—Wikipedia", Dec. 4, 2018, pp. 1-6, XP055898654, Retrieved from the Internet: URL: https://en.wikipedia.org/w/index.php?title=Serverless_computing&oldid=872030767 [retrieved on Mar. 8, 2022].
Anonymous: "System resource—Wikipedia", Dec. 8, 1918, pp. 1-2, XP055898663, Retrieved from the Internet: URL:https://en.wikipedia.org/w/index.php?title=System_resource&oldid=872735453 [retrieved on Mar. 8, 2022].
European Patent Office, Communication pursuant to Article 94(3) EPC, Application No. 19 848 845.4, dated Mar. 17, 2022, 8 pgs.
Intellectual Property India, Examination Report, Application No. 202137010874, dated Feb. 1, 2022, 8 pgs.
U.S. Patent and Trademark Office, "Non-Final Office Action", U.S. Appl. No. 16/408,109, filed Feb. 3, 2022, 13 pgs.
U.S. Patent and Trademark Office, "Non-Final Office Action", U.S. Appl. No. 16/420,700, filed Jan. 21, 2022, 15 pgs.
"Linked list"; https://web.archive.org/web/20180827154939/https://en.wikipedia.org/wiki/Linked_list; Wikipedia; Aug. 27, 2018; accessed Aug. 9, 2022; 17 pages.

* cited by examiner

DISTRIBUTED DEMAND GENERATION PLATFORM

FIELD OF THE DISCLOSURE

The present invention relates generally to a demand generation platform implemented with serverless computing architecture. The demand generation platform receives requests by a user, or intents, to find services and dynamically responds without maintaining a fixed amount of computational resources. The present specification further discloses application management and dynamic databases using the demand generation platform implemented with serverless computing architecture.

BACKGROUND

Traditionally, salon services are booked specifically with a particular salon with which a user is already familiar and that may or may not have online selection and booking abilities. In many cases, appointments are made by calling the particular salon and requesting an appointment time. Some salons have limited online selection and booking abilities; but, each salon maintains its own bookings, so the user must already know which salon she wishes to visit. Once the user knows which salon the user wants to visit, the user can visit that salon's website, which may or may not have online selection and booking abilities. If the salon does have such abilities, the ability is limited to picking a predefined stylist and/or time for an appointment. If the salon does not have such abilities, the user must call the salon. Currently, there does not exist a multi variant tool for finding a salon and making an appointment. Therefore, improvements are desirable.

In addition, traditionally a server is a static set of machines with fixed amount of processors and machine readable memories. With fixed amounts of processors and memories, such a static server has fixed capacities of processing power and memory resources. The fixed capacities are problematic for application developers as well as data centers. Demand for computational resources of an application varies from time to time. For example, when the application was freshly launched to the public, demand for the application may be low. The fixed capacity of the static server may be much greater than the demand, causing waste of capital, time, and human resource to maintain the server. However, after the application is on the market for a period of time, the demand for the application may grow and overwhelm the capacity of the static server, potentially causing jamming or crashing of the server. As such, the traditional static server architecture inevitably mismatches supply and demand, providing either too much or not enough computational resources.

SUMMARY

The embodiments herein disclose demand generation platforms implemented with serverless computing architecture and application management methods. The demand generation platform analyzes the intent of a user to find a particular service and presents options to the user for such service. The serverless architecture responds to demand dynamically. The serverless architecture is automatically scalable to match the change of demand, providing no mismatch between demand and supply of computational resources.

This disclosure uses a salon finding application that uses a demand generation platform, as an example of an application management. It is noted that the computational architecture disclosed is not limited to a salon finding application. Other software applications such as finding a car, a house, a restaurant, a nail shop, a movie, a hotel, a service, or the like can all be similarly managed by the demand generation platform.

According to one embodiment, a demand generation platform includes a salon finding application associated with a social media, wherein an intent for finding a salon is expressed by a user on the social media. The architecture includes an intent analyzer deciphering the intent of the user, a salon service application program interface (API) finding a salon based on the intent, and a database interface responding to a request for making an appointment with the salon.

According to another embodiment, a method of using a demand generation platform includes instructions, when executed by a processor, cause the processor to execute actions comprising: receiving, by a first processor, an indication of an intent in finding a service provided by a salon, wherein the first processor is a processor of a device, the device includes machine readable memory accessible by the first processor; analyzing, by the first processor, the indication of the intent; finding a salon, by the first processor, at least in part, based on the intent analyzed; and receiving, by the first processor, a request from the user to make a reservation for the salon.

According to another embodiment, a method of using a demand generation platform includes instructions, when executed by a processor, cause the processor to execute actions comprising: receiving, by a second processor a request to make an appointment with a salon; throttling, by the second processor, a traffic from processing the request; structuring, by the second processor, a cache for handling the request; and pulling, by the second processor, a configuration file from a dynamic database.

The present invention relates generally to a demand generation platform implemented with serverless computing architecture. The demand generation platform dynamically responds to service requests without maintaining a fixed amount of computational resources. The present specification further discloses application management using the demand generation platform implemented with serverless computing architecture. The demand generation platform, serverless database architecture has the benefit of being scalable to match the change of demand. A database center that operates this demand generation platform can dynamically allocate computational resources to any client/application whenever there is a need. The computational resources operated by the database center can be efficiently allocated to meet the demands. An application developer who uses the services provided by the database center, does not have to worry about the large amount of hardware investments. There is no need for the application developer to provision a piece of hardware. There is no need for the application developer to increase or decrease the amount of physical hardware to meet the change of the demand. The demand generation platform, serverless database is event driven.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

In general, the present disclosure relates to a demand generation platform for generating demand for salon services through a salon application. A multi variant tools spans multiple variants such as Search, Social, SMS, Email, Chat, and Voice to generate demand for salon services. The demand generation platform analyzes the intent of a user to determine a user's desire for some service and then presents options to the user for choices based on the intent or request. For example, a user could search for the word "haircut" using a Google search. The demand generation platform analyzes the search and determines that the user may desire to book a haircut in the surrounding area. The demand generation platform would then return to the user, for example, choices of salons nearby, stylists and/or open appointment times at the nearby salons. The user can then select the salon, the stylist and book a time with little effort.

Figure 1:
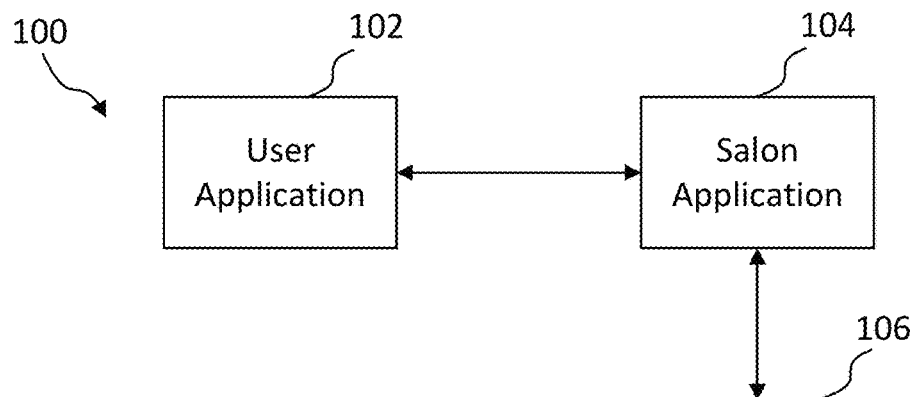
FIG. 1 shows a block diagram of a demand generation platform including a salon application according to one embodiment of the disclosure.
Figure 1:
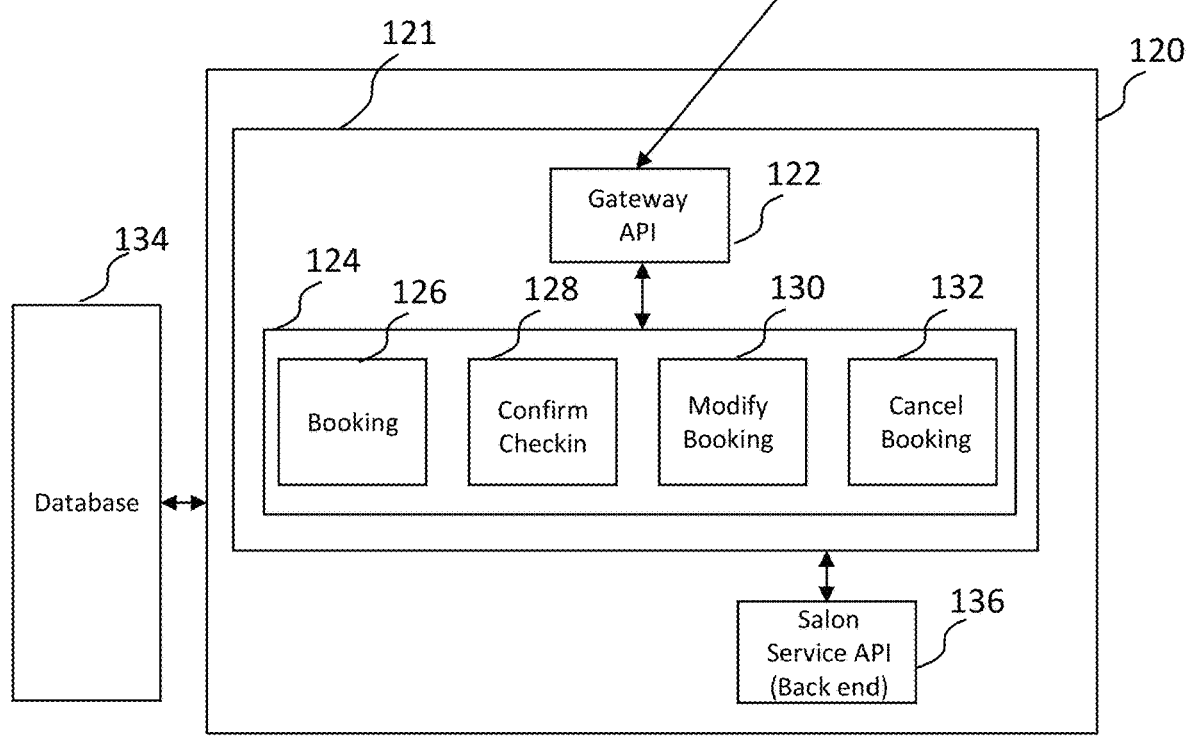

FIG. 1 shows a block diagram of a demand generation platform using a serverless architecture 100 (hereinafter the "platform") applying to a salon application according to one embodiment of the disclosure. The arrows in FIG. 1 mean bidirectional data connections between the referred two blocks. A "data connection" is an electronic connection that communicates electronic information, which may include digital and/or analog data. A data connection may be done through a wired connection, e.g., USB, Ethernet, local area network, etc. A data connection may be done through a wireless connection, e.g., IEEE 802.11x (WiFi), long term evolution (4G LTE), or the like. The data connection may be secured, e.g., encrypted, communication. The data connection may be unsecured, e.g., clear text, communication.

The platform 100 includes a user application 102, a salon application 104, an application assistant 106, a serverless backend system 120 and a database 134. The user application 102 can be any application through which the user interacts to express an interest or intent for a service. The user application 102 can be, for example, a social media, an instant messaging system, a search engine, chat, SMS text message, email, voice, any third party mobile application, an online advertisement, or the like. In one embodiment, the social media includes, e.g., Facebook, Instagram, Twitter, etc. The instant messenger includes, e.g., Google Hangouts, AOL, WhatsApp, or the like. The search engine includes, Google, Bing, Yahoo!, etc. In one embodiment, a user uses one of the above mentioned to express an interest, intent, or need for finding a salon. For example, the user could use a search engine, such as Google, to search for the word "haircut".

There can be a plurality of salon applications 104 associated with each of the examples of a user application 102 all connected to the same application assistant 106, which may include a social media webhook. For example, the salon application 104 can be a first application for Facebook, a second application for Google Hangouts, a third for Apple OS, a fourth for Android, a fifth for Instagram, a sixth for WhatsApp, a seventh for Google search engine, etc. All of the above mentioned salon applications 104 may connect to the same application assistant 106. The interest, intent, or need for finding a salon is received by the salon application 104. The salon application 104 may receive, for example, the identity of the user and the user's location. The identity of the user may come, for example, from an account name of the user for the social media 102. Using the above example, the salon application 104 receives the Google search for the word "haircut" and the current location of the user.

The user application 102 and the salon application 104 may be a single application, according to an example embodiment. For example, the salon application could be a mobile application on a user's mobile device that the user interacts with to convey the user's interest or desire and with which the user gets back information regarding the user's interest or desire.

The salon application 104 communicates with the application assistant 106. The application assistant 106 can be a program running on a user device, e.g., computer, laptop, cell phone, that the social media, instant messenger, search engine, SMS text message, and/or third party mobile app 102 also runs on. The application assistant 106 includes a salon location finder 108, an intent analyzer 110, a booking engine 116, a map application programming interface (API) 112, and a salon service API 114. In one example embodiment, the application assistant 106, salon application 104 and the user application 102 could all be a single application, for example a salon application on a user's mobile device.

The intent analyzer 110 deciphers the interest, intent, or need of the user. The intent analyzer 100 communicates with a salon service API 114 to find the best matching salon(s) for the user's intent. The analysis may include key word analysis that may assist the understanding of what service(s) the user needs, e.g., haircut, hair dying, hairstyle design, makeup, nail services, etc. The intent analyzer 110 may also consider the location of the user and the potential salons. The intent analyzer 110 may further consider a profile of the user for finding a salon, e.g., an age, a gender, a current hair style, an ethnicity, etc. The intent analyzer 110 may also consider the date and time desired by the user, as well as the availability of a salon for that desired time and date. For example, the user that searched for the word "haircut" in the Google browser, probably intended to find a hair salon nearby the user for the purpose of exploring to make an appointment for a haircut. The intent analyzer 110 can also mine data from salons to recommend appointments to same stylist, same schedule and same service(s) as previously booked in addition to seeking to sell additional services the user might be interested in.

The intent analyzer 110 communicates with the salon location finder 108. The salon location finder finds a location of a salon matched by the salon service API 114. The API 114 could use graph QL to query the API itself. The salon location finder 108 communicates with a map API, e.g., Google maps, Bing maps, or the like. In one embodiment, the salon location finder 108 may find a plurality of salons within a certain distance from the user. In another embodiment, the salon location finder 108 may find a salon around a location designated by the user.

The salon location finder 108 returns one or more candidate salons back to the intent analyzer 110. The intent analyzer 110 communicates with the booking engine 116. The booking engine 116 includes functions of booking 140, confirming check-in 142, modifying booking 144, and canceling booking 146. The booking engine 116 may also just allow a user to place itself in line for a haircut called check-in 147. Preferably, the booking engine 116 includes a graphical user interface. The salon application 104 can then communicate back to the user application 102 for options for service, salon, time, stylist, etc. In the example of the search for the word "haircut" the salon application 104 would return a selection of salons back to the user for selection. The salon application 104 could also include a list of stylists and/or booking times. The salon application 104 could also recommend a particular stylist or booking time based on underlying data or preferences. The user can then select or confirm choices, for example by picking a salon, a service, a stylist and an appointment time.

The application assistant 106 communicates with the demand generation platform interface 121 within the serverless backend system 120. The serverless backend system 120 has no physical servers and no instances running; therefore, the code has to be written entirely different than in a server based system. The demand generation platform interface 121 includes a gateway API 122 and a booking engine API 124. The application assistant 106 communicates with the serverless backend system 120. More specifically, the booking engine 116 communicates with the gateway API 122. The gateway API 122 controls data throttling, e.g., defining the amount of megabytes per second and rate the serverless backend system is allowed to receive. When the gateway API 122 receives a request to find a salon, it creates one or more caches to handle the request. The gateway API 122 defines the cache size, the data structure of the cache, forward or backward linkings of the cache, and/or time-to-live of data in the cache.

The gateway API 122 communicates with booking engine API 124. The booking engine API 124 includes functions to process: booking 126, confirming check-in 128, modifying booking 130, and cancelling booking 132. The booking engine API 124 communicates with the database 134 to store the records. Preferably, the database 134 is a dynamic database.

The database 134 does not keep a fixed amount of memory for the salon finding application 104. The database 134 provisions a space, e.g., a table, when requested by the application 104. For example, only when a user requests to make an appointment with a salon, the database 134 creates a table to record the relevant information, e.g., identity of the user, booking date/time, salon location, interested services, interested stylist, etc. Because the database 134 dynamically allocates resources when requested, no unused memory is allocated to the application. In addition, the database 134 uses unstructured data. When an appointment is fulfilled or canceled, the table may be canceled after a certain period of time (time-to-live) according to a data retention policy. Thus, the database 134 is freely scalable (scaling up or down) as the demand of the application changes.

The demand generation platform interface 121 communicates with the salon service API 136. The salon service API may keep the updated information of all salons, e.g., the real-time availability of a salon, available service providers of a salon, specialties of a salon, etc.

Figure 2:
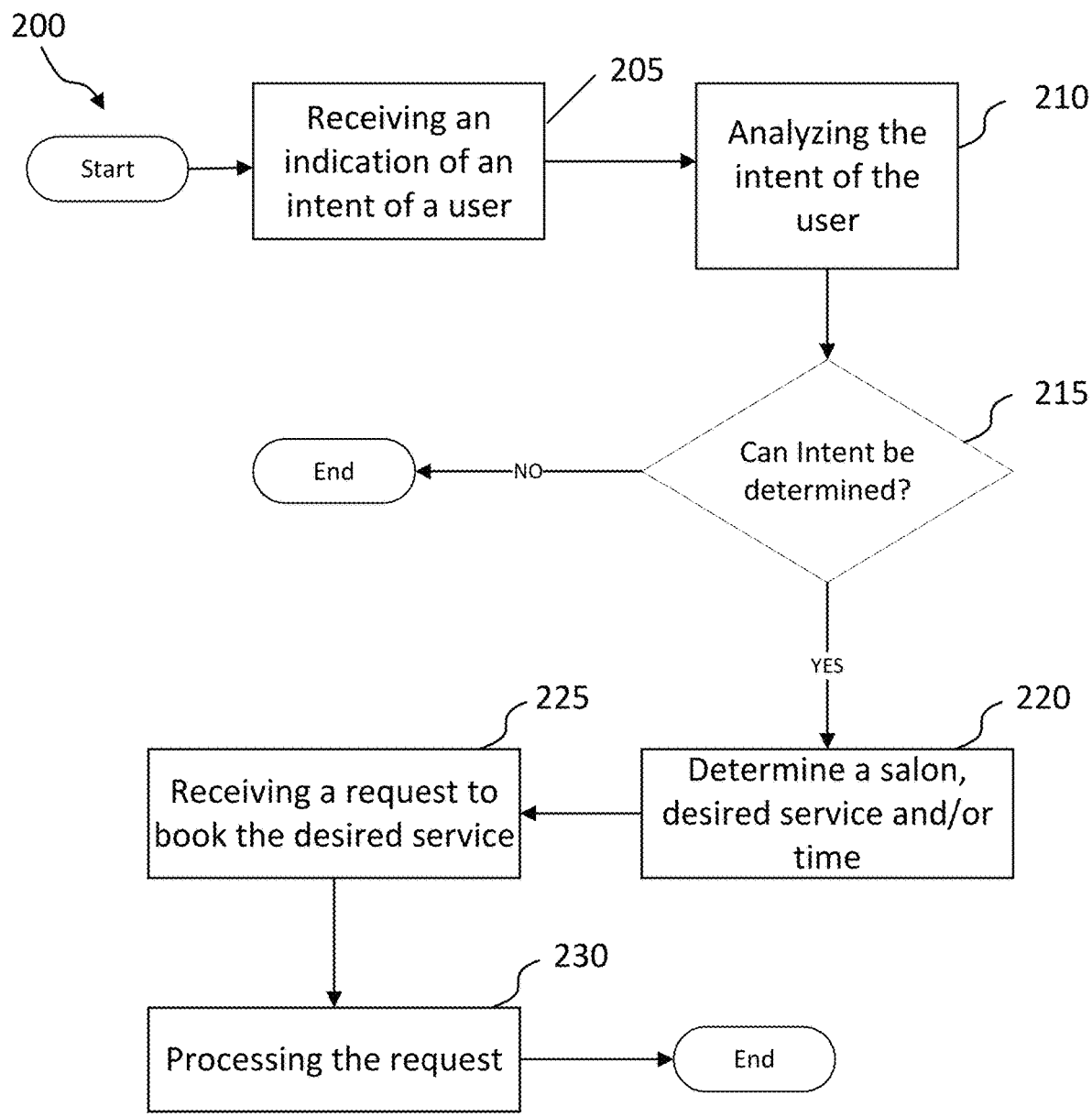
FIG. 2 shows a method of a salon application that uses a demand generation platform and serverless architecture as a backend structure according to one embodiment of the disclosure.

FIG. 2 shows a method 200 of a salon application that uses a demand generation platform and a serverless architecture as a backend system, according to one embodiment of the disclosure. The method 200 can be executed, for example, on the application assistant 106, wherein the application assistant is on the user device, e.g., cell phone, computer, tablet, etc. The method 200 includes 205 receiving, by a first processor, an indication of an intent of a user, wherein the processor is accessible by the application. The indication can be received from a social media, an instant messaging software, a search engine or the like. For example, the indication may be a search for the word "haircut" in a search engine running on a mobile phone or laptop.

The method 200 further includes 210 analyzing, by the first processor, the indication of the intent of the user and determining if the intent can be determined 215. In the above example, the analysis includes determining at least one of the following: a preferred hair style, a preferred service, a preferred price range, a preferred stylist/salon, a preferred franchise of salon, a preferred location of salon, a preferred time/date, a preferred amenity (e.g., parking), etc.

The method 200 includes 220 determining a salon, by the first processor, at least in part, based on the intent analyzed, a location of a person and/or a location of the salon. When finding the salon at 215, other factors mentioned can also be considered, e.g., a preferred hair style, a preferred service, a preferred price range, a preferred stylist/salon, a preferred franchise of salon, a preferred location of salon, a preferred time/date, a preferred amenity (e.g., parking), etc.

The method 200 includes 220 receiving, by the first processor, a request to make a reservation for the salon. The request is made by the user. In one embodiment, when the application detected an intent of the user, the application may proactively prompt the user a message to solicit a request. In other embodiments, the user proactively sends the request. The method 200 includes 230 processing, by the first processor, the request, for example booking a reservation, using a serverless cloud service. In one embodiment, the serverless cloud service can be part of the serverless database management system. This serverless system may be 120 shown in FIG. 1.

Figure 3:
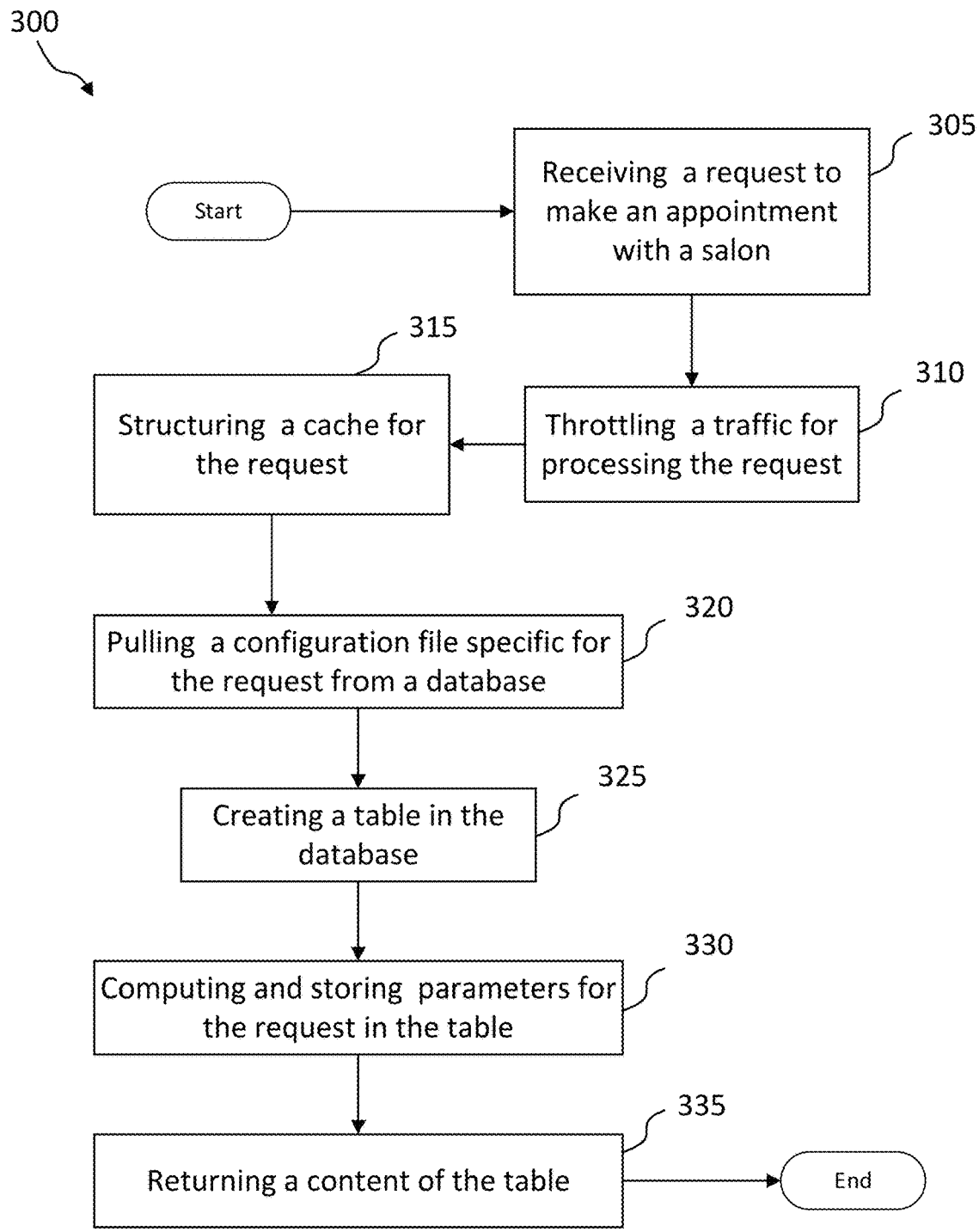
FIG. 3 shows a method of a demand generation platform that uses a serverless architecture to handle a request from a salon application according to one embodiment of the disclosure.

FIG. 3 shows a method 300 of a demand generation platform, serverless database handling a request from a salon finding application according to one embodiment of the disclosure. The demand generation platform, serverless database in method 300 can be 120 shown in FIG. 1. In one embodiment, the method 200 is an application program running on a user device, and method 300 is a program running at the backend database 120.

The method 300 includes 305 receiving, by a second processor of a serverless cloud service system, a request to make an appointment with a salon. The request includes a time, an identity of a client, an identity of a salon, and/or an identity of a stylist. The request is made by a first processor, e.g., a processor of a user device, to the second processor, e.g., a processor of a database. In another embodiment, the salon at 305 is a salon that matches the user's needs the best.

The method 300 includes 310 throttling, by the second processor, a traffic for processing the request. In one embodiment, the throttling of the traffic includes controlling the amount of megabytes of data allowed per second single direction and/or both directions. In one embodiment, the traffic throttling is done by gateway API 122.

The method 300 includes 315 structuring, by the second processor, a cache for the request, wherein the structuring includes sizing a cache, liking caches, defining data retention policy for the cache, or the like. In one embodiment, 315 is executed by the gateway API 122. In one embodiment, when the gateway API 122 receives a request, the gateway API 122 accesses a cache configuration file from the dynamic database 134. The cache configuration file includes at least one of the following information: a size of the cache, forward and/or backward linking of cache, data retention policy for the cache, data structure of the cache.

The method 300 includes 320 pulling, by the second processor, a configuration file specific for the request from a dynamic database. In one embodiment, the configuration file at 320 may be the cache configuration file as described in 315. In another embodiment, the configuration file can be a configuration file of a table for storing salon appointment information.

The method 300 includes 325 creating, by the second processor, a table in the dynamic database. In one embodiment, the table is specific for storing salon appointment information. The table for storing salon appointment information includes at least one of the following: an identity of the user, a service item (e.g., haircut, hairstyling, hair coloring, manicure, etc.), a price or price range, an identity of a stylist/salon, an identity of a franchise of salon, a location of salon, a time/date for the appointment, a preferred amenity (e.g., parking), etc.

The method 300 includes 330 computing and storing, by the second processor, parameters for the request in the table. In one embodiment, the parameters of the table at 330 are global variables such that inquiries for write/read/search/modify within the database at the global level reveals the parameters (e.g., salon appointment related data).

The method 300 includes 335 returning, by the second processor, a content of the table to the first processor. The content may include the information related to the reservation, e.g., an identity of the user, a service item (e.g., haircut, hairstyling, hair coloring, manicure, etc.), a price or price range, an identity of a stylist/salon, an identity of a franchise of salon, a location of salon, a time/date for the appointment, a preferred amenity (e.g., parking), etc. After receiving the content of the table, the user may further modify, confirm, or cancel the appointment.

Figure 4:
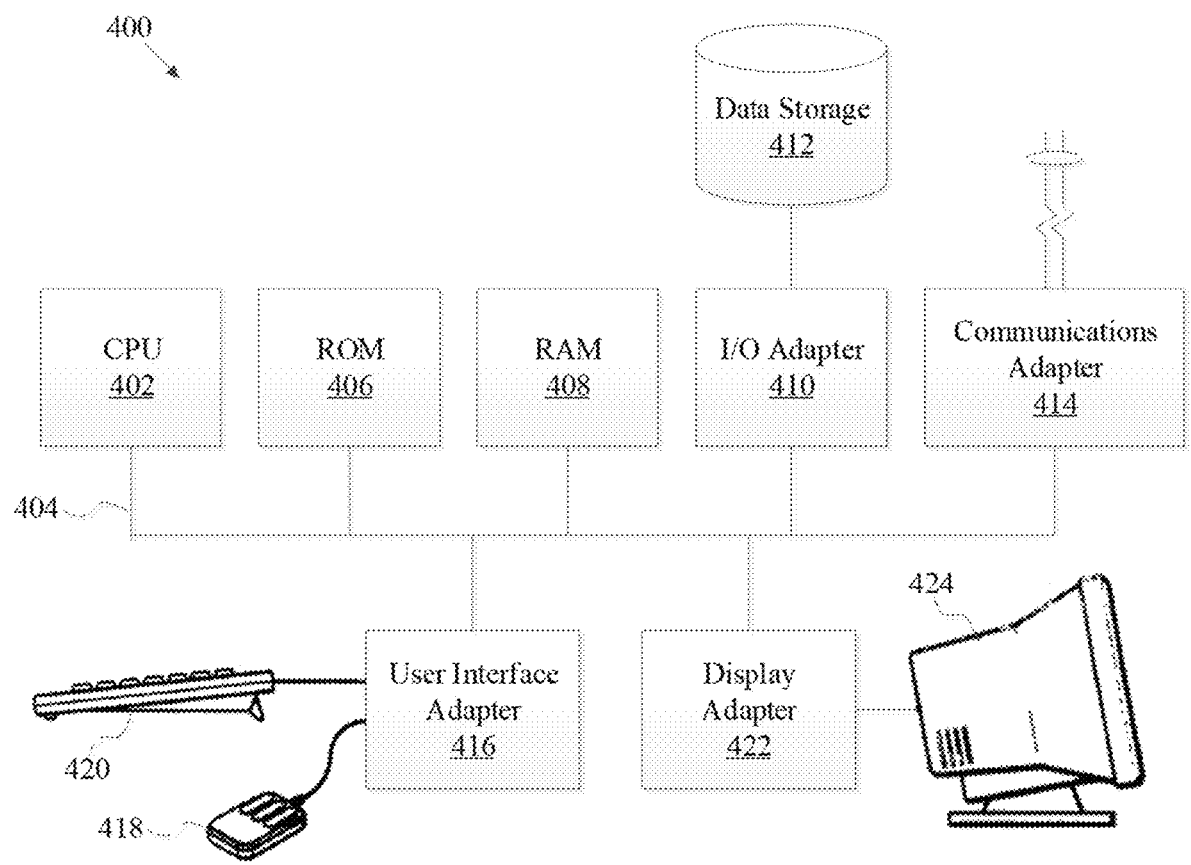
FIG. 4 is a block diagram illustrating a computing system according to one embodiment of the disclosure.

FIG. 4 is a block diagram illustrating a computing system 400 with which the architecture 100 and methods 200, 300 can be implemented according to one embodiment of the disclosure. At least one central processing unit ("CPU") 402 is coupled to a system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations as described herein. The CPU 402 may execute the various logical instructions according to the present embodiments.

The computing system 400 may also include random access memory (RAM) 408, which may be synchronous RAM (SRAM), dynamic RAM (DRAM), synchronous dynamic RAM (SDRAM), or the like. The computing system 400 may utilize RAM 408 to store the various data structures used by a software application. The computing system 400 may also include read only memory (ROM) 406 which may be PROM, EPROM, EEPROM, optical storage, or the like. The ROM may store configuration information for booting the computer system 400. The RAM 408 and the ROM 406 hold user and system data, and both the RAM 408 and the ROM 406 may be randomly accessed.

The computing system 400 may also include an I/O adapter 410, a communications adapter 414, a user interface adapter 416, and a display adapter 422. The I/O adapter 410 and/or the user interface adapter 416 may, in certain embodiments, enable a user to interact with the computing system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computing system 400. According to one embodiment, the data storage 412 may be a separate server coupled to the computer system 400 through a network connection to the I/O adapter 410. The communications adapter 414 may be adapted to couple the computing system 400 to a network, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computing system 400. Rather the computing system 400 is provided as an example of one type of computing device that may be adapted to perform the functions. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 400 may be virtualized for access by multiple users and/or applications.

A "data connection" is an electronic connection that communicates electronic information, which may include digital and/or analog data. A data connection may be done through a wired connection, e.g., USB, Ethernet, local area network, etc. A data connection may be done through a wireless connection, e.g., IEEE 802.11x (WiFi), long term evolution (4G LTE), or the like. The data connection may be secured, e.g., encrypted, communication. The data connection may be unsecured, e.g., clear text, communication. In this specification, if not otherwise specified, the term "data connection" includes both secured and unsecured communications. When the communication is specified as "secured data connection," it refers to encrypted communication, where any encryption/decryption methodology can be applied, including Stealth.

If implemented in firmware and/or software, the functions described above may be stored as one or more instructions or code on a computer-readable medium. Examples include non-volatile computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A demand generation platform comprising:
   a salon application having an intent analyzer, on a first computing device being associated with a social media, wherein an intent for a service at a salon is expressed by a user on the social media and not in the salon application;
   the intent analyzer receiving the intent from the social media and deciphering the intent of the user and creating a request for a service based on the intent;
   an application assistant having a salon service application program interface (API), and a first booking engine, for finding the service based on the request and providing an available booking for the service to the user for confirmation;
   a gateway API, located on a serverless backend system, wherein the gateway API controls data throttling for processing the request and creates a cache having a defined size, data structure and forward and backward linking for the request;
   a second booking engine on the backend system for receiving a confirmation by the user and booking the service, and
   a database interface communicating with a serverless dynamic database using unstructured data and provisioning resources only when requested, wherein the database interface is in communication with the second booking engine for storing the booking in the serverless dynamic database, and communicating with the salon service API to update real-time availability;
   wherein the salon application suggests the service to the user without the user indicating a request for the service in the salon application by deciphering the intent of the user from the social media.

2. The demand generation platform according to claim 1, further comprising
   a salon location finder communicating with the intent analyzer and the salon service API, the salon location finder further communicating with a map API for finding an address of the salon.

3. The demand generation platform according to claim 1, wherein
   the salon service API finds the salon based on, at least in part, a location of the user and a location of the salon.

4. The demand generation platform according to claim 1, wherein
   the salon service API finds the salon based on, at least in part, a time/date the user is available and a time/date the salon is available.

5. The demand generation platform according to claim 1, wherein
   the salon service API finds the salon based on, at least in part, selected from the following: a service item desired, a price range desired, an identity of a stylist, an identity of a franchise of the salon, a time/date for the appointment, and a preferred amenity.

6. The demand generation platform according to claim 1, further comprising
   an appointment booking engine, wherein the appointment booking engine books an appointment, confirms a check-in, allows the user to modify the appointment, and/or cancel an appointment.

7. The demand generation platform according to claim 1, wherein the database interface pulls a configuration file from the dynamic database for provisioning a table to store parameters related to the appointment.

8. A non-transitory computer readable storage medium having embodied thereon a program, the program being executable by a first processor to perform a method of using a demand generation platform, the method comprising:
   receiving, by the first processor, an indication of an intent of a user expressed on a social media in finding a service provided by a salon, wherein the first processor is a processor of a device, the device includes machine readable memory accessible by the first processor;
   deciphering, by the first processor, the indication of the intent;
   generating, by the first processor, a request for a service based on the deciphered indication of intent;
   finding a salon providing the service using a first booking engine, by the first processor;

communicating with a salon service API to determine an available booking for a reservation for the service at the salon, wherein the salon service API provides real-time availability;

communicating with a gateway API, located on a serverless backend system, wherein the gateway API controls data throttling for processing the request and creates a cache having a defined size, data structure and forward and backward linking for handling the request; and communicating, by the gateway API, with a second booking engine to receive a reservation confirmation by the user and book the reservation in a serverless dynamic database that uses unstructured data and provisions resources only when requested; and communicating with the salon service API to update the real-time appointment availability.

9. The method according to claim 8, wherein the deciphering includes determining at least one of the following: a preferred service, a preferred hair style, a preferred price range, a preferred stylist, a preferred franchise of a salon, a preferred location, and a preferred appointment time/date.

10. The method according to claim 8, comprising
processing, by the first processor, the request using the demand generation platform.

11. A method of using a demand generation platform, the method including instructions, when executed by a processor, cause the processor to execute actions comprising
receiving, by a gateway API of a serverless system from a first booking engine on a separate computing system, a request to make an appointment with a salon and an appointment confirmation by a user, wherein the request to make the appointment occurs via a salon service API associated with the first booking engine, wherein the salon service API provides a real-time appointment availability, and wherein the request is generated by an intent analyzer after receiving an intent for a service expressed by the user on a social media and deciphering the intent of the user;

throttling, by the gateway API, a traffic for processing the request;

structuring, by the gateway API, a cache having a defined size, data structure and forward and backward linking for handling the request; and pulling, by a second booking engine, a configuration file from a serverless dynamic database that uses unstructured data provisions resources only when requested;

updating the configuration file to reflect the appointment; and communicating with the salon service API to update the real-time appointment availability.

12. The method according to claim 11, wherein the configuration file defines a data structure of a table for storing parameters related to the appointment.

13. The method according to claim 12, wherein the parameters include at least one of the following: an identity of the user, a location of the user, a preferred service, a preferred hair style, a preferred price range, a preferred stylist, a preferred franchise of the salon, a preferred location, and a preferred appointment time/date.

14. The method according to claim 13, comprising
computing, by the gateway API, the parameters and storing the parameters in the table.

15. The method according to claim 11, wherein the request includes a time/date for the appointment, or an identity of the user.

16. The method according to claim 11, wherein the request is made by a first processor independent from the gateway API.

17. The method according to claim 16, comprising
returning, by the gateway API, a content of the request to the first processor.

* * * * *